(12) United States Patent
Chiluvuri et al.

(10) Patent No.: US 12,316,146 B1
(45) Date of Patent: May 27, 2025

(54) SYSTEMS FOR CONTROLLING CHARGING OF ELECTRICAL DEVICES

(71) Applicant: AMAZON TECHNOLOGIES, INC., Seattle, WA (US)

(72) Inventors: Nayana Teja Chiluvuri, Seattle, WA (US); Fu-Pang Hsu, Bellevue, WA (US); Xunwei Yu, Kirkland, WA (US); Zhao Xu, Bellevue, WA (US); Ming Feng, Cupertino, CA (US); Chang Hwa Rob Yang, Sammamish, WA (US); Shelby Ovrom, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 644 days.

(21) Appl. No.: 17/449,547

(22) Filed: Sep. 30, 2021

(51) Int. Cl.
*H02J 7/00* (2006.01)
(52) U.S. Cl.
CPC .......... *H02J 7/0031* (2013.01); *H02J 7/0036* (2013.01); *H02J 7/0047* (2013.01); *H02J 7/00714* (2020.01)
(58) Field of Classification Search
CPC .................................................. H02J 7/0031
See application file for complete search history.

(56) References Cited

U.S. PATENT DOCUMENTS

| 6,534,955 | B1 * | 3/2003 | Wae | H02J 7/00711 |
| | | | | 320/139 |
| 2015/0126844 | A1 * | 5/2015 | Yang | A61B 5/6823 |
| | | | | 600/382 |
| 2019/0079037 | A1 * | 3/2019 | Jol | G01R 31/66 |
| 2019/0372356 | A1 * | 12/2019 | Tiainen | H02J 7/007 |

* cited by examiner

Primary Examiner — Yalkew Fantu
(74) Attorney, Agent, or Firm — Lindauer Law, PLLC

(57) ABSTRACT

A charger prevents charging of a wearable device battery when sweat or another conductive contaminant is present. The charger initially provides a low voltage to detect when the wearable device is engaged. When the wearable device is engaged, a measured current value exceeds a threshold minimum value. If sweat or another conductive contaminant is present, the additional conductive pathway provided by the contaminant will cause the measured value to exceed a threshold maximum, and charging of the battery is prevented. If a contaminant is not present, the measured value will be greater than the threshold minimum and less than the threshold maximum. A higher voltage may then be provided to charge the battery. When the device is removed from the charger, the measured value will decrease below the threshold minimum and the charger may return to providing low voltage to detect engagement of the device.

20 Claims, 8 Drawing Sheets

TIME = T1 : NO DEVICE CONNECTED TO CHARGER DEVICE

TIME = T2 : DETECT ELECTRICAL DEVICE CONNECTED TO CHARGER DEVICE, POSSIBLE CONTAMINATION

TIME = T3   IN RESPONSE TO POSSIBLE CONTAMINATION, CHARGING VOLTAGE IS NOT APPLIED, DEVICE(S) MAY PRESENT INDICATION OF NON-CHARGING

SYSTEMS FOR CONTROLLING CHARGING OF ELECTRICAL DEVICES

BACKGROUND

Electrical devices that include rechargeable batteries or other types of rechargeable power sources may be connected to a charging device to charge the power source. However, if sweat or other conductive contaminants have accumulated across the charging contacts of a device, application of an electrical voltage across the contaminants may cause electrolysis, which may damage components or create by-products that may be harmful to a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
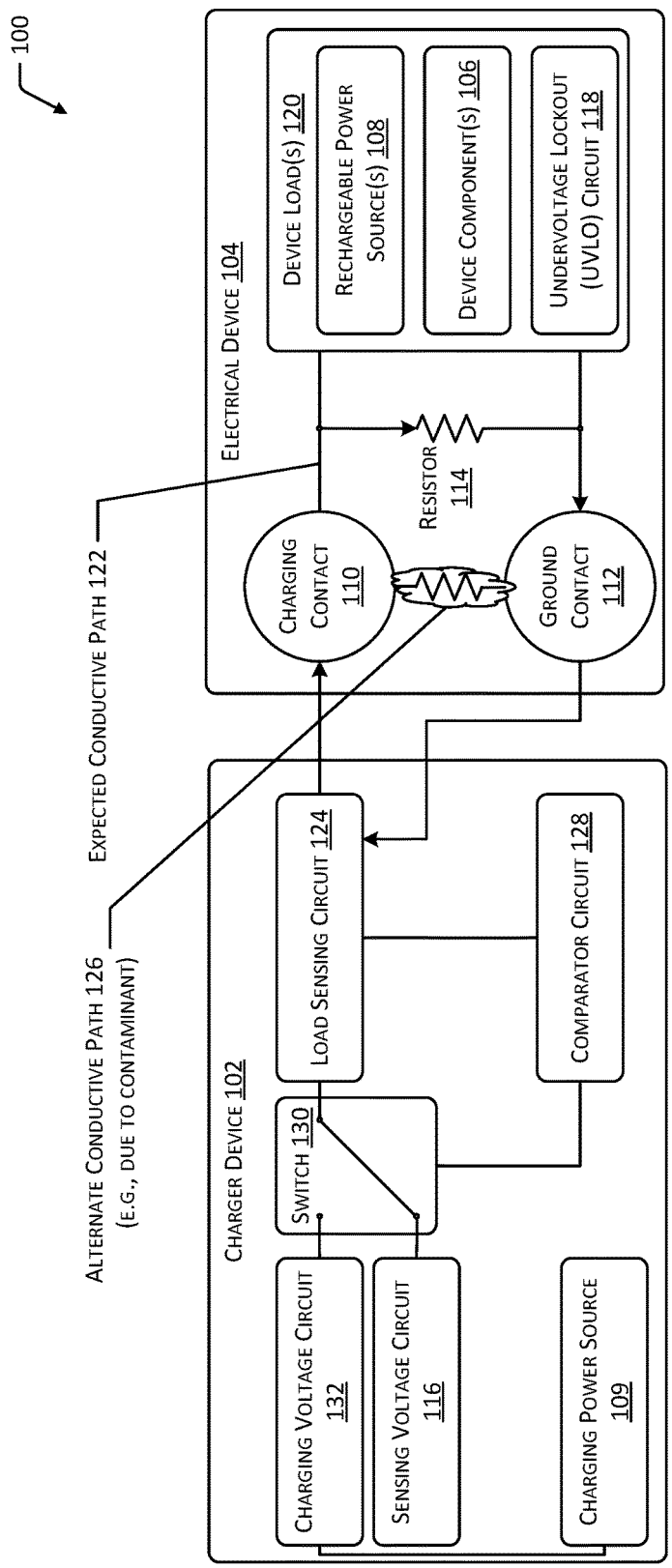
FIG. 1 is a diagram depicting an implementation of a system for controlling the transfer of electrical power from a charger device to an electrical device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Numerous types of electrical devices may include rechargeable batteries, or other types of rechargeable power sources. To charge a power source, electrical contacts of the electrical device may be placed into contact with corresponding contacts of the charging device. Charging circuitry within the electrical device, the charging device, or both devices then controls the conduction of electrical current from the charging device to the power source of the electrical device. In some cases, an electrical device or charging device may be susceptible to accumulation of contaminants on charging contacts. For example, a wearable device may accumulate sweat from a user's body when worn. When a wearable device that has accumulated sweat or another type of conductive contaminant is engaged with a charging device, the conduction of electrical current across the contaminant may cause electrolysis of the contaminant. In some cases, this process may hinder the charging process or cause damage to components of the electrical device or the charging device. Additionally, in some cases, electrolysis of contaminants may generate skin sensitizers or other types of irritants or substances that may be harmful to a user. For example, a user of a wearable device may be unaware of the presence of sweat (which may include saline or other conductive components) that has accumulated on the charging contacts of a wearable device. The user may engage the contaminated wearable device with a charging device, and application of a voltage across the sweat may cause generation of skin sensitizers, which may contact the user's skin when the user removes the wearable device from the charging device and dons the wearable device.

Existing systems for detecting sweat or other types of moisture or contaminants on an electrical device may require use of components specifically included for the purpose of detecting contaminants, or components that are unrelated to the charging of a power source, which may increase the time, cost, and complexity associated with production and use of electrical devices. For example, charging of a wearable device typically only requires use of two contacts: a charging contact and a ground contact. However, systems for detecting sweat, or other types of contaminants, may utilize additional electrical contacts, such as sense pins, to detect impedance between the charging pin and ground pin, or other more complex components and processes, such as analog-to-digital converters, microcontrollers, or smart circuitry.

Described in this disclosure are systems that may prevent a charging device from providing electrical power to a power source of an electrical device if a contaminant, such as sweat, is present. In some implementations, the techniques used to prevent charging of a device affected by a contaminant may be performed using only two electrical contacts on the device, reducing cost and complexity associated with production and use of devices. The charging device initially provides a low voltage to the electrical device. Load sensing circuitry associated with the charging device may then determine a current value based on the application of the low voltage across the electrical device.

The measured current value may be used to detect the presence of a known or expected electrical device connected to the charging device. For example, the electrical device may include a known resistance between the charging contacts of the electrical device. In some implementations, the known resistance may be established using a resistor having a known resistance value that is connected to the charging contacts. The electrical device may also include an undervoltage lockout circuit (UVLO) that prevents other components of the electrical device from consuming current when the low voltage is applied to enable the current associated with the low voltage to be conducted across the resistance.

The UVLO may therefore enable an expected load drawn by the electrical device under application of the low voltage to be generally proportional to the known resistance value of the electrical device. As a result, when the electrical device is engaged with the charging device, a measured current value greater than or equal to a threshold minimum value that corresponds to the known resistance value, or another selected threshold minimum value, may indicate that the electrical device is engaged with the charging device. In other implementations, engagement of an electrical device with a charging device may be detected using a measured impedance value, such as through application of alternating current (AC) to the electrical device. Detection of a particular impedance value or range of values may indicate the presence of the electrical device.

The measured resistance value may also be used to detect the possible presence of sweat or other conductive contaminants between the charging contacts of the electrical device. If a conductive contaminant has accumulated on the electrical device, the contaminant may function as an additional conductive pathway between the charging contacts of the electrical device. As a result, the low voltage provided to the electrical device may be conducted across the expected conductive pathway having the known resistance value, as well as across one or more additional conductive pathways in parallel that are created due to the presence of a conductive contaminant. For example, the expected conductive pathway may comprise a resistor with a specified value. In such a case, the measured current value determined by the load sensing circuitry may be greater than a threshold maximum value indicative of the presence of one or more possible additional conductive pathways for the low voltage.

If the measured current value is greater than the threshold minimum value that corresponds to the known resistance value, or another selected threshold minimum value, indicating the presence of an electrical device engaged with the charging device, and if the measured current value is less than the threshold maximum value, indicating the absence of additional conductive pathways that may be due to contaminants, the charging device may apply a greater voltage to the electrical device to charge the power source of the electrical device. For example, the UVLO circuit associated with the electrical device may enable the greater voltage to be conducted to the power source of the electrical device. If the measured current value is less than the threshold minimum value, indicating the absence of an electrical device engaged with the charging device, or if the measured current value is greater than the threshold maximum value, indicating the presence of an additional conductive pathway that may be due to a contaminant, the greater voltage may not be applied by the charging device. As a result, the greater voltage does not cause electrolysis of conductive contaminants and the possible generation of skin sensitizers or other undesired components. In such a case, the charging device may instead continue to provide the lower voltage until a measured current value that is greater than the threshold minimum value and less than the threshold maximum value is determined.

In some implementations, an electrical device may include one or more additional conductors, such as a pin or other component, other than the charging contact and ground contact, that is not used to charge the power source of the electrical device. Contaminants may potentially create a conductive pathway that contacts the additional conductor. In such a case, detection of the conductive pathway using the additional pin may be used to cause the device to present an indication of the possible presence of contaminants. Additionally, in some implementations, the additional pin may be selectively biased to function as either a charging contact or ground contact, such that if a conductive contaminant forms an alternate conductive pathway between the additional pin and one of the other contacts, the presence of the contaminant may be detected without requiring the contaminant to contact both the charging contact and the ground contact, and use of a charging voltage may be prevented.

After the charging device begins to provide the greater voltage to the electrical device, the load sensing circuitry may continue to determine a measured current value, which may be used to detect the continued presence of the electrical device. For example, while the electrical device remains engaged to the charging device, the measured current value may remain greater than or equal to the threshold minimum value that corresponds to the known resistance value, or another selected threshold minimum value. However, when the electrical device is disengaged from the charging device, the measured current value may be less than the threshold minimum value. In response to the measured current value being less than the threshold minimum value, the charging device may cease providing the greater voltage and return to providing the lower voltage until a subsequent time when a measured current value greater than the threshold minimum value and less than the threshold maximum value is detected.

In some implementations, after the charging device begins to provide the greater voltage to the electrical device, the threshold maximum value may be increased to a selected maximum value to provide overcurrent protection to components the electrical device. For example, if the measured current value exceeds the increased threshold maximum value, this may indicate a load that could potentially damage one or more components of the electrical device. In such a case, the charging device may cease providing the greater voltage, or the voltage provided by the charging device may be decreased until a measured current value less than the threshold maximum value and greater than the threshold minimum value is determined.

Implementations described in this disclosure therefore enable a charging device to detect the presence of an electrical device, as well as the presence of additional conductive pathways that may be due to contaminants, using a low voltage that may not significantly cause electrolysis of the contaminants, by measuring a current value during application of the low voltage. Implementations described herein may also enable a charging device to detect disengagement of the electrical device from the charging device and provide overcurrent protection for the electrical device using the same components, based on the measured current value during application of a greater voltage to charge the power source of the electrical device.

FIG. 1 is a diagram depicting an implementation of a system 100 for controlling the transfer of electrical power from a charger device 102 to an electrical device 104. The electrical device 104 may include any type of device having one or more device components 106 that are powered using one or more rechargeable power sources 108. For example, the electrical device 104 may include a wearable device, such as a smartwatch, a fitness tracking device, a physiological monitor, and so forth. Continuing the example, the electrical device 104 may include device components 106 such as one or more displays, speakers, haptic output devices, touch sensors, microphones, physiological sensors, and so forth, which may be powered using one or more rechargeable batteries, such as a lithium-ion battery, or one or more other rechargeable power sources 108. The charger device 102 may include any type of device capable of providing electrical power to one or more device components 106 or rechargeable power sources 108 of the electrical device 104 when a conductive path between circuitry of the charger device 102 and the device components 106 or rechargeable power source(s) 108 of the electrical device 104 is established. For example, the charger device 102 may include one or more charging power sources 109 or may be engaged with a source of alternating current, such as an electrical outlet, and may transfer electrical power from the charging power source(s) 109 to charge the rechargeable power source(s) 108 of the electrical device 104 when electrical contacts of the charger device 102 are engaged with electrical contacts of the electrical device 104 to establish a conductive path. Continuing the example, the electrical device 104 may include two conductors, a charging contact 110 and a ground contact 112, which may have the form factor of pins or another type of contact, that engage corresponding contacts of the charger device 102. When engaged with the charger device 102, a conductive pathway may be established between the charging contact 110 and ground contact 112.

In some cases, one or more of the charging contact 110, ground contact 112, or other portions of the electrical device 104 may be exposed to sweat or another type of contaminant. When sweat or another conductive contaminant is present, application of a voltage to the electrical device 104 may cause electrolysis of the contaminant, which may hinder the charging process, damage components of the charger device 102 or electrical device 104, or create skin sensitizers or other undesired substances that may harm a user of the electrical device 104. The charger device 102 may therefore be configured to detect the possible presence of sweat or another contaminant and prevent application of a voltage greater than a selected threshold value to the electrical device 104 if the possible presence of a contaminant is detected.

In some implementations, the electrical device 104 may include a resistor 114 having a known resistance value. In other implementations, a known resistance may exist between the charging contact 110 and ground contact 112 in the absence of a resistor 114, or one or more other components may be used in addition to or in place of the resistor 114 to provide the electrical device 104 with the known resistance value. The resistor 114 may be in electrical contact with the charging contact 110 and ground contact 112, such that current conducted to the charging contact 110 will also be conducted through the resistor 114 toward the ground contact 112, enabling a load that corresponds to the known resistance value to be measured. The charger device 102 may initially apply a low voltage to the electrical device 104 using a sensing voltage circuit 116 to control the voltage that is applied. The electrical device 104 may include an undervoltage lockout (UVLO) circuit 118, which may prevent current having a voltage less than a threshold minimum value from being conducted to the rechargeable power source(s) 108, deice component(s) 106, or other device loads 120 associated with the electrical device 104. As a result, the low voltage applied using the sensing voltage circuit 116 may be conducted through the electrical device 104 along an expected conductive path 122 from the charging contact 110, through the resistor 114, to the ground contact 112. A load sending circuit 124 associated with the charger device 102 may determine a measured current value associated with the voltage applied along the expected conductive path 122 through the resistor 114. Because the UVLO circuit 118 prevents conduction of the low voltage to the device load(s) 120, under normal conditions, the only conductive path for the current having the low voltage may be the expected conductive path 122 that includes the resistor 114. As a result, the measured current value determined using the load sensing circuit 124 may correspond to a threshold minimum current value based on the known resistance value of the resistor 114. If the measured current value determined using the load sensing circuit 124 is less than the threshold minimum value, this may indicate that no device is engaged with the charger device 102, or that the electrical device 104 is not properly engaged with the charger device 102. However, a measured current value greater than the threshold minimum value may be used to detect the engagement between the charger device 102 and electrical device 104.

As described previously, in some cases, sweat or another contaminant may accumulate on the electrical device 104 at or near the location of the charging contact 110 or the ground contact 112. In such a case, the presence of a conductive contaminant may create an alternate conductive path 126 between the charging contact 110 and the ground contact 112. Conduction of current across the alternate conductive path 126 may cause electrolysis of the contaminant and generate by-products that could harm a user of the electrical device 104, hinder the charging process, damage components of the charger device 102 or the electrical device 104, and so forth. The measured current value determined using the load sensing circuit 124 may also be used to determine the possible presence of a contaminant, or another source of an alternate conductive path 126. If an alternate conductive path 126 between the charging contact 110 and ground contact 112 exists, such as due to the presence of a conductive contaminant, the low voltage applied to the electrical device 104 will be conducted through both the expected conductive path 122 and the alternate conductive path 126. In such a case, the measured current value determined using the load sensing circuit 124 will be greater than a threshold maximum value that may indicate the possible presence of an alternate conductive path 126. In such a case, the charger device 102 may be prevented from applying a higher voltage to the electrical device 104.

A comparator circuit 128 associated with the charger device 102 may determine whether the measured current value determined using the load sensing circuit 124 is greater than a threshold minimum value and less than a threshold maximum value. If the measured current value is less than a threshold minimum value, which in some implementations may correspond to the known resistance value of the resistor 114, this may indicate that no device is engaged with the charger device 102, or that the electrical device 104 is not properly engaged with the charger device 102. In such a case, the charger device 102 may be prevented from applying a higher voltage, and use of the sensing voltage circuit 116 to apply a low voltage may be continued. If the measured current value is greater than a threshold maximum value that may correspond to conduction of the low voltage along both the expected conductive path 122 and one or more alternate conductive paths 126, this may indicate the possible presence of one or more contaminants on the electrical device 104. In such a case, the charger device 102 may be prevented from applying a higher voltage to avoid the possibility of electrolysis of contaminants and resulting damage to the devices or a user, and use of the sensing voltage circuit 116 to instead apply the lower voltage may be continued. If the measured current value is greater than the threshold minimum value and less than the threshold maximum value, this may indicate that the electrical device 104 is properly engaged with the charger device 102, and no additional alternate conductive path 126 is present. In such a case, the comparator circuit 128 may provide a signal or otherwise control a switch 130 in the charger device 102. The switch 130 may be controlled to enable a charging voltage circuit 132 to apply a higher voltage to the electrical device 104. The higher voltage associated with the charging voltage circuit 132 may be sufficient, such that the UVLO circuit 118 of the electrical device 104 does not prevent conduction of the higher voltage to the device load(s) 120. Therefore, the higher voltage may be used to charge the rechargeable power source(s) 108 of the electrical device 104, supply power to the device component(s) 106, and so forth.

During provision of the higher voltage to the electrical device 104, the load sensing circuit 124 of the charger device 102 may periodically or continuously continue to determine a measured current value indicative of one or more loads drawn by the electrical device 104. If the measured current value is determined to be below the threshold minimum value, this may indicate that the electrical device 104 has been disengaged from the charger device 102. In such a case, the comparator circuit 128 may cause the switch 130 to return to the configuration shown in FIG. 1, to enable the sensing voltage circuit 116 to apply the lower voltage and prevent the charging voltage circuit 132 from applying the higher voltage. In some implementations, when the higher voltage is applied to the electrical device 104, the threshold maximum value to be determined by the load sensing circuit 124 may be increased. For example, the device load(s) 120 associated with the electrical device 104 may be associated with a larger measured current value than the initial threshold maximum value. However, the increased threshold maximum value may be used to provide overcurrent protection or protection from an abnormal load that draws current of a magnitude greater than the increased threshold maximum value. For example, in response to a measured current value greater than the increased threshold maximum value, the voltage applied to the electrical device 104 using the charging voltage circuit 132 may be decreased or ceased. If the measured current value remains above the threshold minimum value and below the increased threshold maximum value, the charger device 102 may continue to provide the higher voltage from the charging voltage circuit 132 to the electrical device 104.

Figure 2:
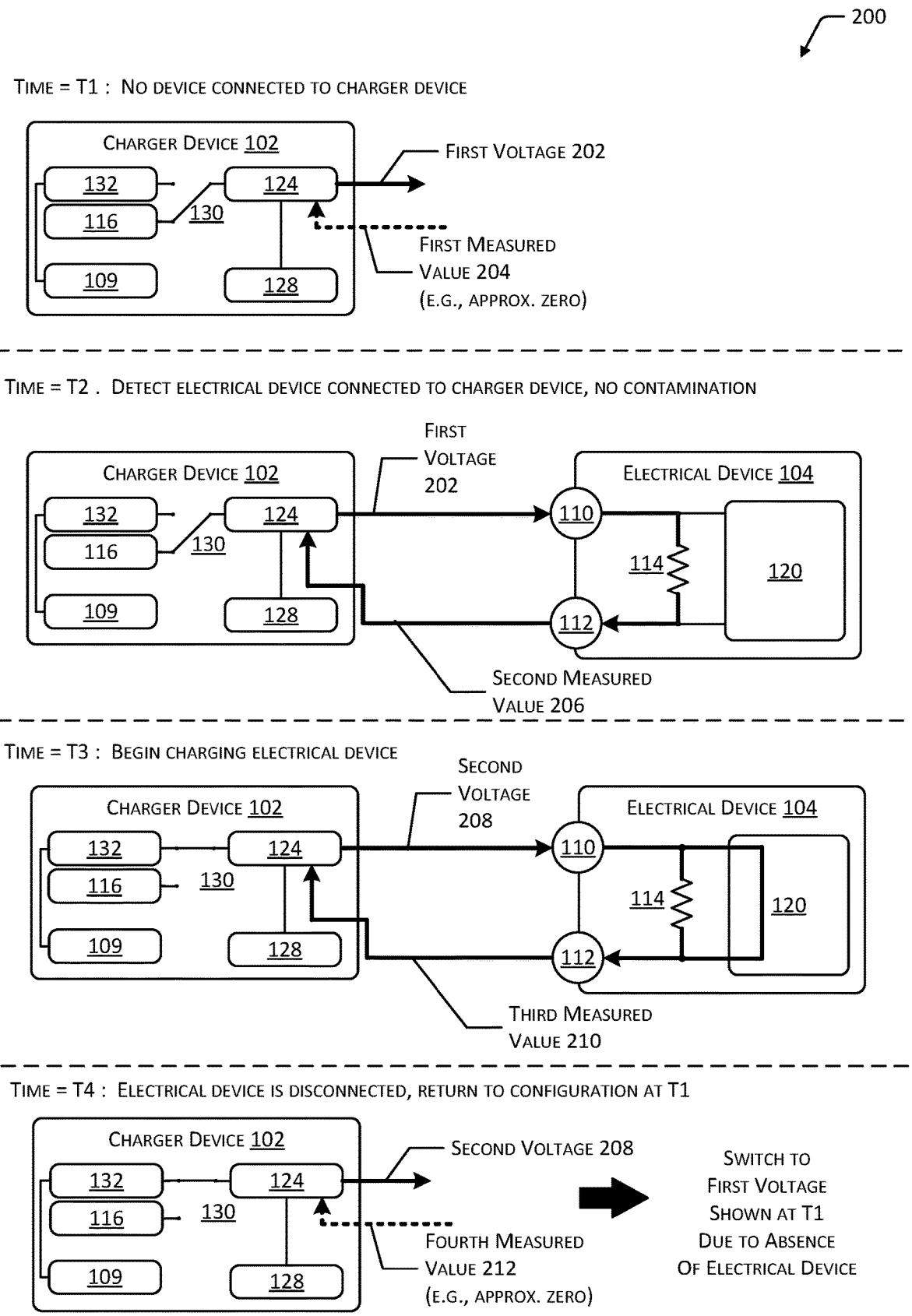
FIG. 2 is a series of diagrams illustrating an implementation of a process for controlling the transfer of electrical power to an electrical device based on measured values indicative of loads.

FIG. 2 is a series of diagrams illustrating an implementation of a process 200 for controlling the transfer of electrical power to an electrical device 104 based on measured values indicative of loads. At a first time T1, a charger device 102 may be configured for use, such as by providing the charger device 102 with a connection to a charging power source 109 or other source of electrical power, but at the first time T1, no device may be connected to the charger device 102, or an electrical device 104, if present, may not be properly engaged with the charger device 102. Therefore, at the first time T1, the sensing voltage circuit 116 may cause the charger device 102 to attempt to apply a first voltage 202 to an electrical contact of the charger device 102. The first voltage 202 may be a generally low voltage that would normally be insufficient to charge a rechargeable power source 108 of an electrical device 104, such as due to the presence of a UVLO circuit 118 in the electrical device 104 that prevents drawing of current having the low voltage by a rechargeable power source 108 or other device component 106 of the electrical device 104. Due to the absence of an engagement between the charger device 102 and the electrical device 104, at the first time T1, the load sensing circuit 124 of the charger device 102 may determine a first measured value 204 that is approximately zero. For example, application of the first voltage 202 when no device is engaged with the charger device 102, or when the electrical device 104 is not properly engaged with the charger device 102, may result in no measurable load being drawn, and thus a measured current value of approximately zero.

At a second time T2, an electrical device 104 may be engaged with the charger device 102, and the connection of the electrical device 104 to the charger device 102 may be detected. In the example shown in FIG. 2, the electrical device 104 may not be affected by sweat or other contaminants that create an alternate conductive path 126. Therefore, application of the first voltage 202 to the electrical device 104 may cause the current associated with the first voltage 202 to be conducted along an expected conductive path 122, as described with regard to FIG. 1. For example, an expected conductive path 122 may extend from a charging contact 110 of the electrical device 104 across a resistor 114 to a ground contact 112 of the electrical device 104. In such a case, the load sensing circuit 124 of the charger device 102 may determine a second measured value 206 indicative of a load drawn by the electrical device 104 while the first voltage 202 is applied. For example, the second measured value 206 may be indicative of an amount of current drawn by the electrical device 104 as current is conducted along the expected conductive path 122 from the charger device 102 to the charging contact 110, across the resistor 114, to the ground contact 112, and to the charger device 102. The electrical device 104 may include a UVLO circuit 118 that may cause current associated with the first voltage 202 to be conducted across the resistor 114 without additional current being drawn by device loads 120, such as device components 106 or rechargeable power sources 108. Therefore, the second measured value 206 may be proportional to a known resistance value of the resistor 114.

At a third time T3, in response to the second measured value 206, charging of the rechargeable power source 108 of the electrical device 104 may be initiated. A comparator circuit 128 associated with the charger device 102 may determine that the second measured value 206 is greater than a threshold minimum value that is less than or equal to a current associated with the known resistance value of the resistor 114. This determination may indicate that the electrical device 104 is engaged with the charger device 102. The comparator circuit 128 may also determine that the second measured value 206 is less than a threshold maximum value that corresponds to the presence of one or more alternate conductive paths 126 in addition to the expected conductive path 122 that includes the resistor 114. This determination may indicate that no alternate conductive paths 126 between the charging contact 110 and ground contact 112 of the electrical device 104 are present, such as conductive paths due to the presence of contaminants. In response to the second measured value 206 being greater than the threshold minimum value and less than the threshold maximum value, a switch 130 associated with the charger device 102 may be actuated to cause a charging voltage circuit 132 to apply a second voltage 208 that is greater than the first voltage 202 to the electrical device 104. The second voltage 208 may be conducted through the expected conductive path 122 that includes the resistor 114. The second voltage 208 may also be conducted to one or more device loads 120 associated with the electrical device 104. For example, the higher second voltage 208 may be sufficient such that a UVLO circuit 118 associated with the electrical device 104 does not prevent drawing of current associated with the second voltage 208 by the device load(s)

120. While the second voltage 208 is applied to the electrical device 104, the load sensing circuit 124 of the charger device 102 may determine a third measured value 210 indicative of the conduction of current along the expected conductive path 122 as well as to one or more device loads 120. The third measured value 210 may be used to detect disengagement of the electrical device 104 from the charger device 102, and in some implementations, to detect abnormal loads or currents.

For example, at a fourth time T4, the electrical device 104 may be disconnected from the charger device 102, and the charger device 102 may be returned to the configuration shown at the first time T1. When the electrical device 104 is disengaged from the charger device 102, the charger device 102 may determine a fourth measured value 212 that is less than the threshold minimum value. For example, after disengagement of the electrical device 104 from the charger device 102, application of the second voltage 208 may result in a fourth measured value 212 of approximately zero. In response to the fourth measured value 212 being less than the threshold minimum value, the switch 130 may be actuated to cause the charging voltage circuit 132 to cease applying the second voltage 208 and to cause the sensing voltage circuit 116 to resume applying the first voltage 202. In some implementations, the charger device 102 may also be configured to cease application of the second voltage 208 or reduce the second voltage 208 if a measured value greater than a threshold maximum value is determined. The threshold maximum value during application of the second voltage 208 may be selected to provide overcurrent protection or prevent drawing of an abnormal load by the electrical device 104. For example, the threshold maximum value during charging of the rechargeable power source 108 of the electrical device 104 may be greater than the threshold maximum value used to detect the presence of alternate conductive pathways 126 prior to application of the second voltage 208. Therefore, the same circuitry of the charger device 102 that is used to detect the presence or absence of the electrical device 104 and the possible presence of alternate conductive pathways 126 may also be used to provide overcurrent protection or prevent drawing of abnormal loads by the electrical device 104.

Figure 3:
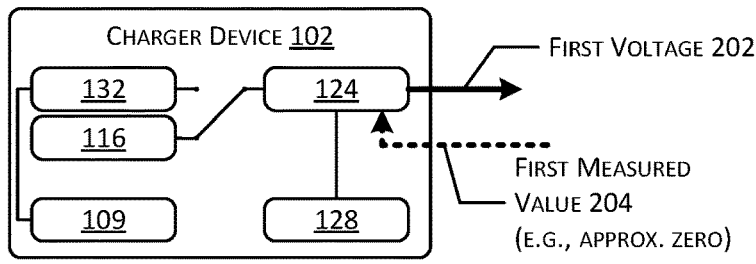
FIG. 3 is a series of diagrams illustrating an implementation of a process for preventing the transfer of electrical power to an electrical device when a conductive contaminant is detected.
Figure 3:
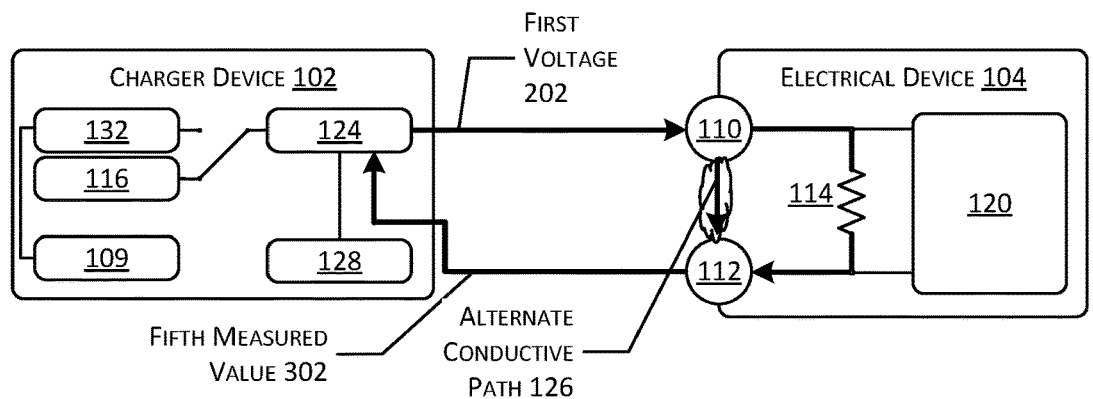
Figure 3:
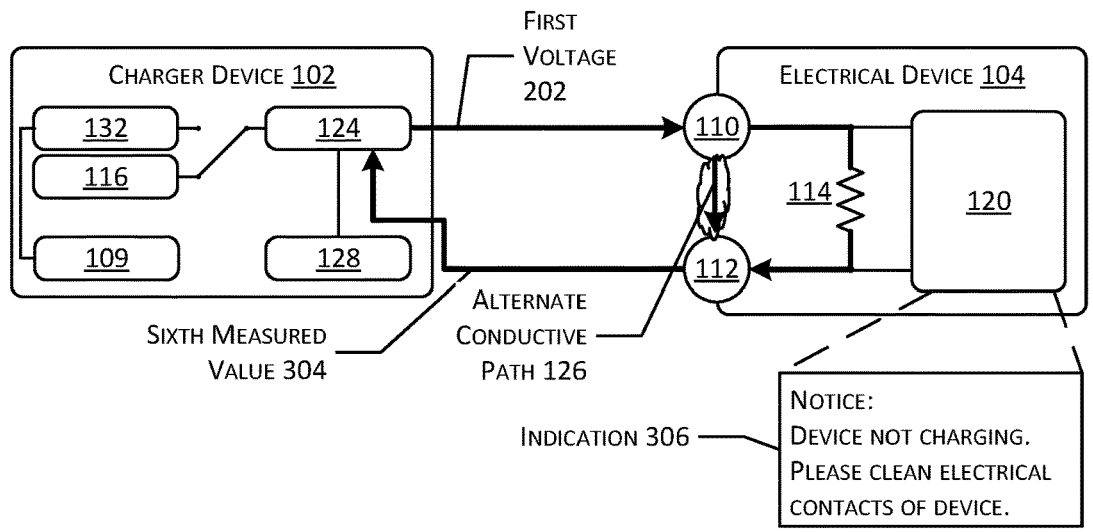

FIG. 3 is a series of diagrams illustrating an implementation of a process 300 for preventing the transfer of electrical power to an electrical device 104 when a conductive contaminant is detected. At a first time T1, a charger device 102 may be configured for use, but no electrical device 104 may be engaged with the charger device 102. The sensing voltage circuit 116 of the charger device 102 may attempt to apply a first voltage 202, which may be a low voltage that would normally be insufficient to charge a rechargeable power source 108 of an electrical device 104, such as due to the presence of a UVLO circuit 118 in the electrical device 104. At the first time T1, the load sensing circuit 124 of the charger device 102 may determine a first measured value 204 that is less than a threshold minimum value. For example, the first measured value 204 may be approximately zero due to the absence of a device engaged with the charger device 102, which may result in no measurable load being drawn.

At a second time T2, an electrical device 104 may be engaged with the charger device 102, and the connection of the electrical device 104 to the charger device 102 may be detected. In the example shown in FIG. 3, the electrical device 104 may be affected by sweat or other contaminants that create an alternate conductive path 126 between the charging contact 110 and ground contact 112 of the electrical device 104. In such a case, application of the first voltage 202 to the electrical device 104 by the charger device 102 may cause the current associated with the first voltage 202 to be conducted along an expected conductive path 122 across a resistor 114, as described with regard to FIGS. 1 and 2, as well as across an alternate conductive path 126 due to the conductive contaminants that have accumulated at or near the location of the charging contact 110 and ground contact 112. The load sensing circuit 124 of the charger device 102 may therefore determine a fifth measured value 302 indicative of a load drawn by the electrical device 104 while the first voltage 202 is applied. The fifth measured value 302 may be greater than a threshold minimum value that corresponds to the resistance value of the resistor 114, but may also be greater than a threshold maximum value that corresponds to the presence of one or more alternate conductive paths 126. For example, the presence of multiple conductive paths may result in a measured value that indicates a load associated with the electrical device 104 that is greater than an expected load associated with the resistor 114.

At a third time T3, in response to the fifth measured value 302 which may indicate the possible presence of contamination, a higher voltage is not applied to the electrical device 104 by the charging voltage circuit 132. In some implementations, one or more of the electrical device 104 or the charger device 102 may present an indication 306 that charging of the rechargeable power source 108 of the electrical device 104 has not begun. For example, an indication 306 may include a visible output, such as text or an image, presented on a display of the electrical device 104 or charger device 102, actuation of one or more lights or other visible indicators, an audible or haptic output, and so forth. Continuing the example, if the charger device 102 detects a first measured value 302 representing a current greater than a threshold maximum value, indicating the presence of an alternate conductive path 126, circuitry of the charging device may cause illumination of a light emitting diode (LED), presentation of text or other visual output, presentation of audio output, and so forth. In other implementations, the electrical device 104 may include components, such as an analog to digital converter, microcontroller, and so forth, that may detect voltage applied to the electrical device 104 by the charger device 102. For example, a detected voltage of zero may indicate that the electrical device 104 is not connected to the charger device 102. A detected voltage that is greater than zero, or another threshold minimum value, but less than a threshold associated with a UVLO circuit 118 of the electrical device 104 may indicate the possible presence of an alternate conductive path 126, in response to which the electrical device 104 may present an indication 306. In some implementations, in response to the fifth measured value 302, the charger device 102 may continue to apply the first voltage 202 to the electrical device 104 and may determine a sixth measured value 304 indicative of one or more loads drawn by the electrical device 104. For example, over time, sweat or another contaminant may evaporate or flow away from the charging contact 110 or ground contact 112. If the sixth measured value 304 is below the threshold maximum value and above the threshold minimum value, indicating that the alternate conductive path 126 between the charging contact 110 and ground contact 112 is no longer present, the switch 130 of the charger device 102 may be actuated to enable the charging voltage circuit 132 to apply a higher voltage to the electrical device 104. In other implementations, in response to the fifth measured value 302 being greater than the threshold maximum value, application of the first voltage 202 by the charger device 102 may be ceased. In some cases, after discontinuing application of the first voltage 202, the charger device 102 may periodically apply the first voltage 202 to the electrical device 104 and determine a measured value to determine whether one or more alternate conductive paths 126 are still present and whether the electrical device 104 remains engaged with the charger device 102.

Figure 4:
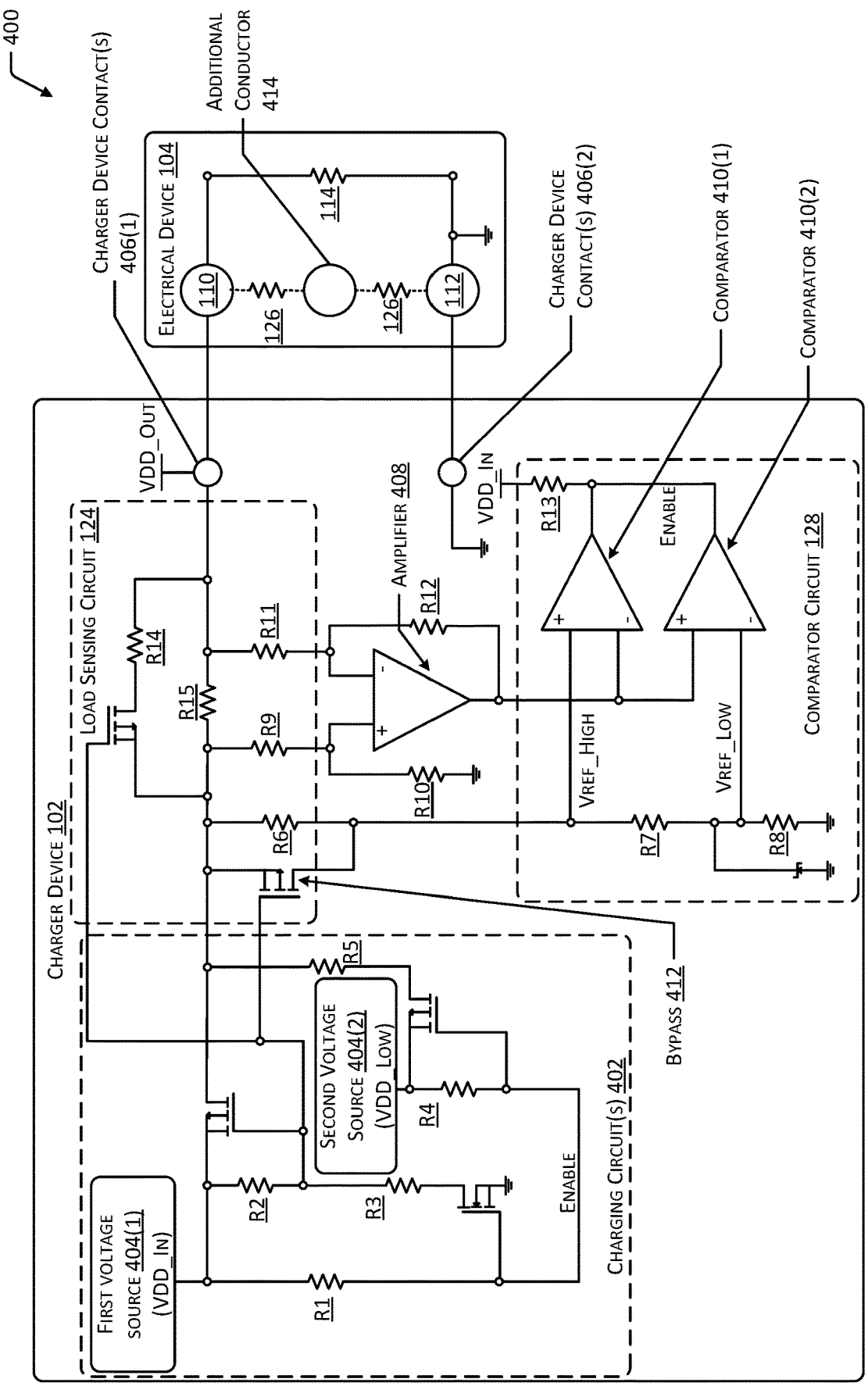
FIG. 4 is a diagram illustrating an implementation of a charger device within the present disclosure.

FIG. 4 is a diagram 400 illustrating an implementation of a charger device 102 within the present disclosure. The charger device 102 may include charging circuits 402, such as the charging voltage circuit 132 and the sensing voltage circuit 116, described with regard to FIGS. 1-3. The charging circuits 402 may selectively be used to cause current associated with a first voltage source 404(1) or a second voltage source 404(2) to be provided to an electrical device 104 engaged with the charger device 102, based on measured values determined using a load sensing circuit 124. The voltage associated with the first voltage source 108(1) may be greater than the voltage associated with the second voltage source 108(2). For example, a lower voltage may be initially applied to the electrical device 104 to determine the possible presence of one or more alternate conductive paths 126, which may be caused by the presence of conductive contaminants. If the measured value indicates a connected electrical device 104 and does not indicate the presence of an alternate conductive path 126, a higher voltage may be applied to the electrical device 104 to charge a rechargeable power source 108 of the electrical device 104.

The electrical device 104 may be engaged with the charger device 102 by associating the charging contact 110 and ground contact 112 of the electrical device 104 with corresponding charger device contacts 406(1) and 406(2), respectively, of the charger device 102. Association between the charger device contacts 406 and the electrical contacts of the electrical device 104 may enable current from the charging circuit(s) 402 to be provided from the charger device 102 to the electrical device 104. As described with regard to FIG. 1, when a low voltage associated with the second voltage source 404(2) is applied to the electrical device 104, the current associated with the low voltage may be conducted along an expected conductive path 122 that includes a resistor 114 having a known resistance value. If one or more alternate conductive paths 126 are present on the electrical device 104, such as due to the presence of a conductive contaminant, the current associated with the low voltage may be conducted along the expected conductive path 122 as well as the alternate conductive path(s) 126. The load sensing circuit 124 of the charger device 102 may determine a measured value indicative of the load drawn by the electrical device 104. If the current associated with the low voltage is conducted only along the expected conductive path 122, the measured value will correspond to the known value of the resistor 114. However, if the current is conducted along one or more alternate conductive paths 126, the measured value will be greater than the expected measured value associated with the resistor 114. In some implementations, the load sensing circuit 124 may determine the measured value using one or more resistors 114. For example, one resistor R14 or set of resistors R14 may have a resistance value that corresponds to conduction of current having the low voltage along the expected conductive path 122, while another resistor R15 or set of resistors R15 may be associated with a larger resistance value that corresponds to conduction of current along one or more alternate conductive paths 126.

The comparator circuit 128 associated with the charger device 102 may determine whether the measured value determined using the load sensing circuit 124 is within a threshold range (e.g., greater than a threshold minimum value and less than a threshold maximum value), or outside of the threshold range. In some implementations, an amplifier 408 may be used to modify electrical signals conducted between the load sensing circuit 124 and comparator circuit 128. One or more comparators 410 associated with the comparator circuit 128 may be used to control electrical signals that are conducted to the charging circuit(s) 402, which may control whether current associated with the first voltage source 404(1) or the second voltage source 404(2) is provided to the electrical device 104. For example, a first comparator 410(1) may be associated with a threshold maximum current value that may indicate the presence of one or more alternate conductive paths 126. A second comparator 410(2) may be associated with a threshold minimum current value that corresponds to the resistance value of the resistor 114 associated with the expected conductive path 122. In response to a measured value determined by the load sensing circuit 124 that is greater than the threshold minimum value and less than the threshold maximum value, the comparator circuit 128 may cause a current associated with the first voltage source 404(1) (e.g., a higher voltage to charge a rechargeable power source 108) to be provided to the electrical device 104. In response to a measured value that is less than the threshold minimum value or greater than the threshold maximum value, the comparator circuit 128 may cause a current associated with the second voltage source 404(2) (e.g., a lower voltage to detect engagement with the electrical device 104 and the absence of alternate conductive paths 126) to be provided to the electrical device 104. While FIG. 4 depicts the threshold minimum and threshold maximum current values depending on the voltage associated with the first voltage source 404(1), in other implementations, the threshold values may be determined independent of the voltage sources 404, such as through use of a regulator or other component.

In some implementations, the charger device 102 may include a bypass 412 component, such as a field effect transistor (FET), resistor, series of resistors, and so forth that may be used to bypass a corresponding resistor R6 or series of resistors when current associated with the first voltage source 108(1) is provided to the electrical device 104. For example, the bypass 412 may be used to remove or increase the threshold maximum value associated with the measured value(s) determined using the load sensing circuit 124. Continuing the example, while current from the charger device 102 is used to charge a rechargeable power source 108 of the electrical device 104 or power one or more other device loads 106, the load drawn by the electrical device 104 may be greater than the initial threshold maximum value associated with the possible presence of alternate conductive pathways 126. Use of the bypass 412 may enable the threshold maximum value to be increased or disregarded during charging of the rechargeable power source 108.

While the charging contact 110 and ground contact 112 of the electrical device 104 may be used to charge a rechargeable power source 108 of the electrical device 104 and detect the possible presence of one or more alternate conductive paths 126, in some implementations, the electrical device 104 may include one or more additional conductors 414. For example, the electrical device 104 may include a pin or other component that may be used to provide input to or receive output from the electrical device 104 during manufacturing, testing, use, and so forth. While the additional conductor 414 may not be necessary to charge a rechargeable power source 108 of the electrical device 104, in some implementations, the additional conductor 414 may be used to determine one or more alternate conductive paths 126, and in some cases to cause the electrical device 104 to present an indication of the alternate conductive path(s) 126. For example, an alternate conductive path 126 that includes the additional conductor 414 may apply a voltage across the additional conductor 414, which may be determined by the load sensing circuit 124 or one or more components of the electrical device 104. If the additional conductor 414 is associated with a known voltage or known current value, the measured voltage or current value associated with the additional conductor 414 may indicate the presence or absence of an alternate conductive path 126.

Figure 5:
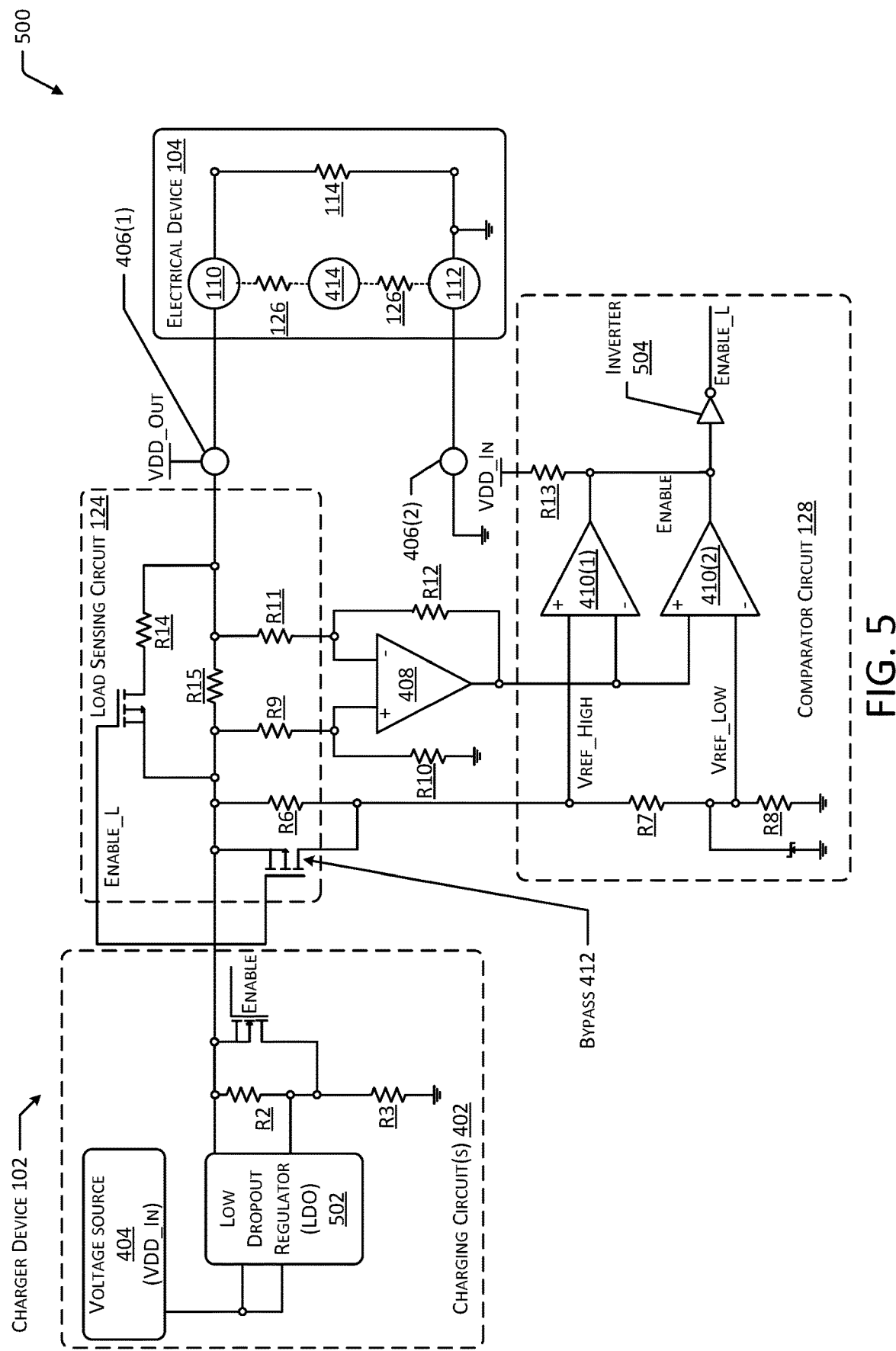
FIG. 5 is a diagram illustrating an implementation of a charger device within the present disclosure.

FIG. 5 is a diagram 500 illustrating an implementation of a charger device 102 within the present disclosure. As described with regard to FIG. 4, the charger device 102 may include a charging circuit 402 that may be used to selectively apply lower and higher voltages to an electrical device 104 engaged with the charger device 102. A load sending circuit 124 may determine measured values indicative of a load drawn by the electrical device 104. A comparator circuit 128 may determine a relationship between the measured value(s) and threshold minimum and maximum values. The determined relationship may be used to control the voltage applied by the charging circuit 402.

In the implementation shown in FIG. 5, a low dropout regulator (LDO) 502 may be used to control the voltage applied from a voltage source 404 to the electrical device 104. Based on the measured value determined by the load sensing circuit 124 and the determined relationship between the measured value and the threshold minimum and maximum values determined by the comparator circuit 128, a signal from the comparator circuit 128, which may be modified using an inverter 504, may be used to control the voltage the passes through the LDO 502. In some cases, the output voltage of the LDO 502 may be dynamically changed by altering the feedback voltage divider of the LDO 502, such as by using a bypass FET or other component as a feedback pin for the LDO 502.

As described with regard to FIGS. 1-4, when a low voltage is applied to the electrical device 104, current associated with the low voltage is typically conducted along an expected conductive path 122 that includes a resistor 114 having a known resistance value, unless a conductive contaminant across the contacts of the electrical device 104 is present. In the absence of a conductive contaminant, the measured value may correspond to the known resistance value of the resistor 114. In cases where an alternate conductive path 126 exists, the measured value may be greater due to increased current drawn by the electrical device 104. As described with regard to FIG. 4, the load sensing circuit 124 may determine a measured value indicative of the load drawn by the electrical device 104 using sets of resistors R14, R15 having resistance values that correspond to conduction of current along the expected conductive path 122 or an alternate conductive path 126. The comparator circuit 128 may use one or more comparators 410, and the inverter 504, to control electrical signals conducted to the charging circuit 402, which may use the LDO 502 to control whether current associated with the lower voltage or higher voltage is provided to the electrical device 104.

In some implementations, as described with regard to FIG. 4, the charger device 102 may include a bypass 412, such as an FET, resistor, series of resistors, and so forth, to bypass a corresponding resistor R6 or set of resistors when current associated with the higher voltage is provided to the electrical device 104. The bypass 412 may be used to remove or increase the threshold maximum value.

Figure 6:
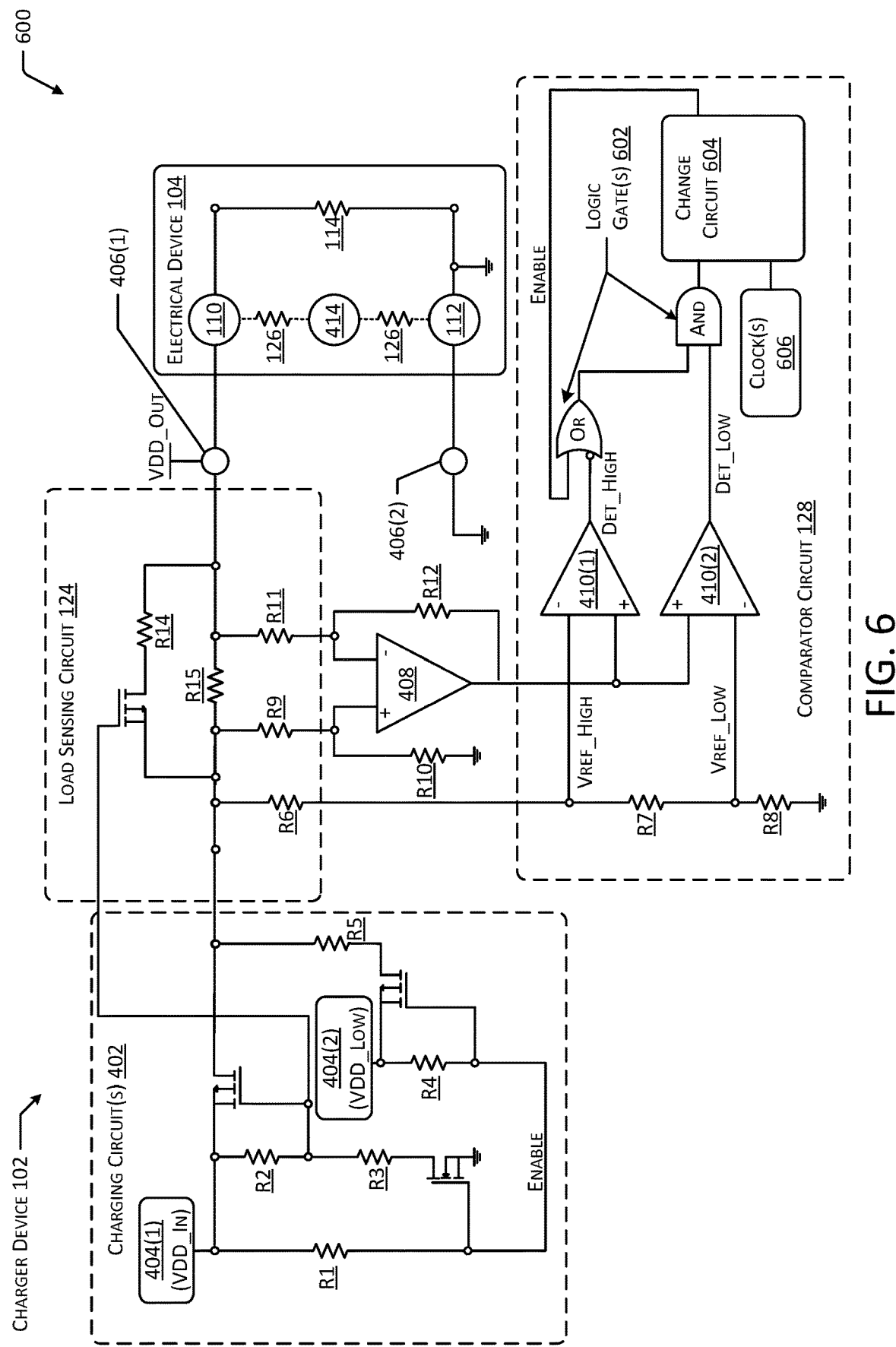
FIG. 6 is a diagram illustrating an implementation of a charger device within the present disclosure.

FIG. 6 is a diagram 600 illustrating an implementation of a charger device 102 within the present disclosure. As described with regard to FIG. 4, the charger device 102 may include charging circuits 402, such as a charging voltage circuit 132 and sensing voltage circuit 116 used to selectively apply a higher voltage associated with a first voltage source 404(1) or a lower voltage associated with second voltage source 404(2) to an electrical device 104 engaged with the charger device 102. A load sensing circuit 124 may determine measured values indicative of a load drawn by the electrical device 104, and a comparator circuit 128 may determine a relationship between the measured value(s) and threshold minimum and maximum values. For example, a lower voltage may be initially applied by the charger device 102, and the load sensing circuit 124 may determine a first measured value. If the first measured value exceeds a threshold minimum value that corresponds to a known resistance value of the electrical device 104, this may indicate that the electrical device 104 is engaged with the charger device 102. If the first measured value is less than the threshold minimum value, this may indicate that the electrical device 104 is not engaged with the charger device 102. If the first measured value is less than a threshold maximum value that corresponds to the possible presence of one or more alternate conductive paths 126 associated with the electrical device 104, this may indicate that no alternate conductive paths 126 due to conductive contaminants are present, and the charger device 102 may begin applying a higher voltage to the electrical device 104 to charge a rechargeable power source 108 thereof. If the first measured value is greater than the threshold maximum value, this may indicate that one or more alternate conductive paths 126 are present, use of the higher voltage may be omitted, and in some cases, an indication 306 of the possible presence of one or more alternate conductive paths 126 may be presented. After the higher voltage is applied to the electrical device 104, the load sensing circuit 124 may determine a second measured value. If the second measured value is greater than the threshold minimum value, this may indicate that the electrical device 104 remains engaged with the charger device 102, and application of the higher voltage is continued. If the second measured value is less than the threshold minimum value, this may indicate that the electrical device 104 has been disengaged from the charger device 102, application of the higher voltage is ceased, and application of the low voltage by the charger device 102 is resumed. While the higher voltage is applied to the electrical device 104, the threshold maximum value may be disregarded, or in some implementations, increased to a greater value to provide overcurrent protection or prevent drawing of an abnormal load by the electrical device 104. If the second measured value exceeds the increased threshold maximum value, application of the higher voltage may be ceased, or the higher voltage may be reduced.

As described with regard to FIGS. 1-5, when a low voltage associated with the second voltage source 404(2) is applied to the electrical device 104, the current associated with the low voltage may be conducted along an expected conductive path 122 that includes a resistor 114 having a known resistance value. The first measured value may correspond to the known resistance value if no alternate conductive paths 126 are present, but may exceed a threshold maximum value if one or more alternate conductive paths 126 are present. In some implementations, the load sensing circuit 124 may determine the measured value using one or more resistors R15, which may have a resistance value that corresponds to the conduction of current along one or more alternate conductive paths 126. In other implementations, the resistor(s) R15 may correspond to one or more other selected resistance values, or additional resistors R15 or sets of resistors R15 may be used.

The comparator circuit 128 associated with the charger device 102 may determine whether the measured value determined using the load sensing circuit 124 is within a threshold range (e.g., greater than a threshold minimum value and less than a threshold maximum value), or outside of the threshold range using one or more comparators 410. The signal(s) that are used to control the voltage that is applied to the electrical device 104 may be determined based at least in part on a change circuit 604, such as a flip-flop or other circuit configured to change between two or more states. The change circuit 504 may periodically determine whether a signal to change operation of the charging circuit(s) 402 from the lower voltage to the higher voltage, or from the higher voltage to the lower voltage, is to be used based on conduction of signals from the comparators 410 through logic gates 602. The periods at which the relationship between measured values and the threshold values is determined and at which signals are used to control the charging circuit(s) 402 may be determined based on one or more clocks 606. In one implementation, control of the charging circuit(s) 402 using the change circuit 604 may be determined based on Table 1 below:

TABLE 1

| Initial Voltage | Above Threshold Minimum? | Below Threshold Maximum? | Final Voltage |
|---|---|---|---|
| Low | No | No | Low |
| Low | Yes | No | Low |
| Low | No | Yes | Low |
| Low | Yes | Yes | High |
| High | No | No | Low |
| High | Yes | No | High |
| High | No | Yes | Low |
| High | Yes | Yes | High |

As described in Table 1, above, if a lower voltage associated with the second voltage source 404(2) is currently applied to the electrical device 104, the lower voltage will continue to be applied until a measured value that is both above the threshold minimum and below the threshold maximum is determined. If a higher voltage associated with the first voltage source 404(1) is currently applied to the electrical device 104, the higher voltage will continue to be applied until a measured value that is below the threshold minimum is determined. While FIG. 6 depicts the threshold minimum and threshold maximum current values depending on the measured current value rather than voltage associated with the first voltage sources 404, in other implementations, the threshold values may be determined based on the voltage associated with the first voltage source 404(1), as shown in the example implementation of FIG. 4.

Figure 7A:
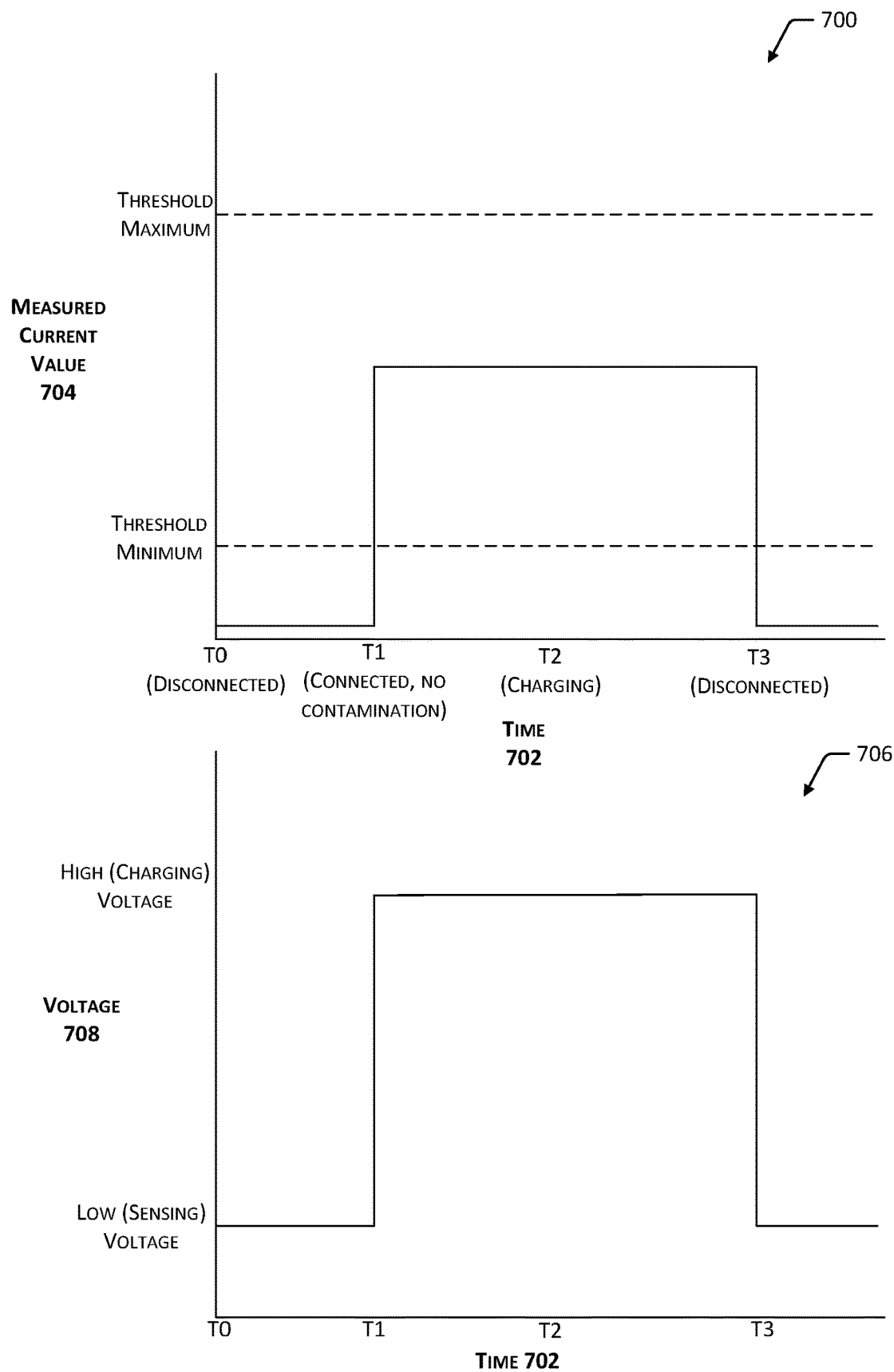
FIG. 7A is a series of graphs illustrating an implementation of a relationship between a measured current value and a voltage applied to an electrical device over time when the measured current value is within a threshold range.

FIG. 7A is a series of graphs illustrating an implementation of a relationship between a measured current value and a voltage applied to an electrical device 104 over time when the measured resistance value is within a threshold range. In a first graph 700, the horizontal axis represents Time 702, while the vertical axis represents measured current value 704. At an initial time T0, a charger device 102 may be disconnected from an electrical device 104. Therefore, at the initial time T0, the measured current value may be zero, or a nominal value less than a threshold minimum value. The threshold minimum value may correspond to a resistance value associated with a resistor 114 of the electrical device 104. For example, the threshold minimum value may be greater than or equal to a magnitude of current that is proportional to the known resistance value associated with the resistor 114. In some implementations, the threshold maximum value, threshold minimum value, and resistance value of the resistor 114 may be selected as measured current value 704 that corresponds to the resistance value of the resistor 114 and is approximately equidistant from the threshold maximum value and the threshold minimum value.

At a first time T1, the electrical device 104 may be engaged with the charger device 102, and the measured current value may increase to a value greater than the threshold minimum value. If the electrical device 104 is not affected by sweat or other contaminants that create one or more alternate conductive paths 126, the measured current value may be less than a threshold maximum value that corresponds to the presence of one or more alternate conductive paths 126. In such a case, in response to the measured current value, during a second time T2, a higher voltage may be applied to the electrical device 104 to charge a rechargeable power source 108 of the electrical device 104. During the second time T2, the measured current value may remain above the threshold minimum value and below the threshold maximum value. At a third time T3, the electrical device 104 may be disengaged from the charger device 102, and the measured current value may decrease to a value less than the threshold minimum value.

In a second graph 706, the horizontal axis represents time 702, while the vertical axis represents voltage 708. From the initial time T0 to the first time T1, while the electrical device 104 is disconnected from the charger device 102, a low voltage may be applied by the charger device 102, which may be used to detect engagement of an electrical device 104 to the charger device 102. At the first time T1, in response to a measured current value that is greater than the threshold minimum value and less than the threshold maximum value, the applied voltage may be increased to a higher voltage suitable for charging a rechargeable power source 108 of the electrical device 104. For example, a measured current value greater than the threshold minimum value may indicate proper engagement between the electrical device 104 and the charger device 102, while a measured current value less than the threshold maximum value may indicate the absence of one or more alternate conductive paths 126 between the electrical contacts of the electrical device 104. At the third time T3, in response to the measured current value decreasing to a value below the threshold minimum value, the voltage applied by the charger device 102 may decrease to the initial lower voltage.

Figure 7B:
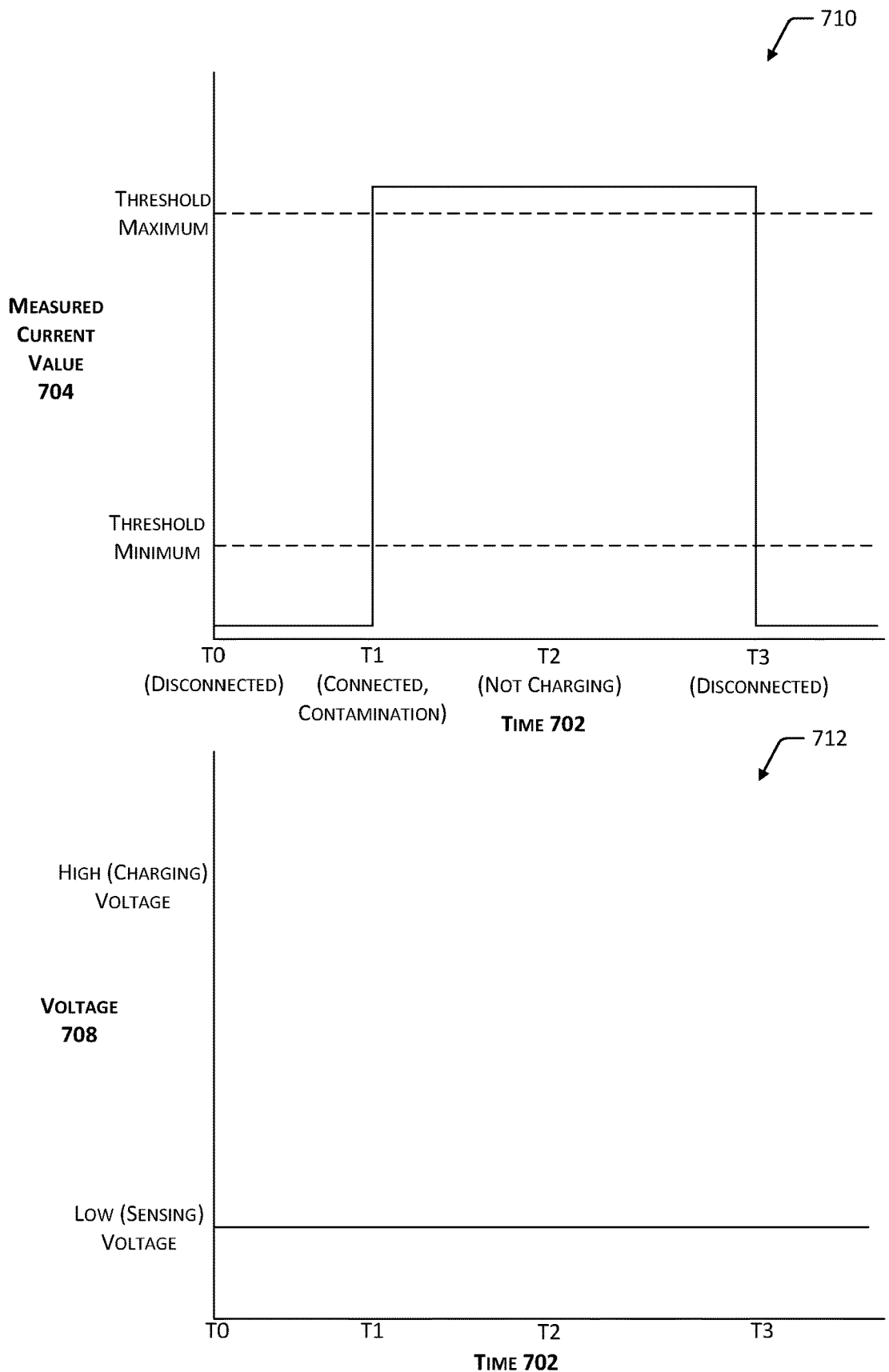
FIG. 7B is a series of graphs illustrating an implementation of a relationship between a measured current value and a voltage applied to an electrical device over time when the measured current value is outside of a threshold range.

FIG. 7B is a series of graphs illustrating an implementation of a relationship between a measured current value and a voltage applied to an electrical device 104 over time when the measured current value is outside of a threshold range. In a third graph 710, the horizontal axis represents Time 702, while the vertical axis represents measured current value 704. At an initial time T0, a charger device 102 may be disconnected from an electrical device 104. Therefore, at the initial time T0, the measured current value may be zero, or a nominal value less than a threshold minimum value.

At a first time T1, the electrical device 104 may be engaged with the charger device 102, and the measured current value 704 may increase to a value greater than the threshold minimum value. If the electrical device 104 is affected by sweat or other contaminants that create one or more alternate conductive paths 126 between the electrical contacts of the electrical device 104, the measured current value 704 may be greater than a threshold maximum value. In such a case, in response to the measured current value, during a second time T2, the lower voltage may continue to be applied to the electrical device 104, and a higher voltage may not be applied to charge the rechargeable power source 108 to avoid possible electrolysis of contaminants. At a third time T3, the electrical device 104 may be disengaged from the charger device 102, and the measured current value 704 may decrease to a value less than the threshold minimum value.

In a fourth graph 712, the horizontal axis represents time 702, while the vertical axis represents voltage 708. From the initial time T0 to the first time T1, while the electrical device 104 is disconnected from the charger device 102, a low voltage may be applied by the charger device 102, which may be used to detect engagement of an electrical device 104 to the charger device 102. At the first time T1, because the measured current value is greater than the threshold maximum value, the low voltage may continue to be applied, rather than applying a higher voltage suitable for charging a rechargeable power source 108 of the electrical device 104. For example, a measured current value greater than the threshold maximum value may indicate the possible presence of one or more alternate conductive paths 126 between the electrical contacts of the electrical device 104, which may be present due to sweat or other contaminants. At the third time T3, when the measured current value decreases to a value below the threshold minimum value, the charger device 102 may continue to apply the lower voltage.

The processes discussed in this disclosure may be implemented in hardware, software, or a combination thereof. For example, the processes described herein may be implemented using analog circuits, digital circuits, or computer-executable instructions stored on one or more computer-readable storage media that, when executed by one or more hardware processors, perform the described operations. For example, computer-executable instructions may include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    a wearable device comprising:
        a rechargeable battery;
        a charging circuit connected to the rechargeable battery;
        a charging contact connected to the charging circuit;
        a ground contact connected to the charging circuit; and
        a resistor connected between the charging contact and the ground contact, wherein the resistor is associated with a first resistance value; and
    a charger device comprising:
        first circuitry to provide a first voltage to the charging contact, wherein the first voltage is conducted across the resistor;
        second circuitry to provide a second voltage greater than the first voltage to the charging contact, wherein the second voltage is conducted to the rechargeable battery; and
        third circuitry in electrical communication with the charging contact and the ground contact, wherein the third circuitry detects a first current value associated with provision of the first voltage to the charging contact, and in response to the first current value being:
            greater than a threshold minimum value that corresponds to the first resistance value, and
            less than a threshold maximum value that is indicative of an alternate electrical conductive path between the charging contact and the ground contact,
        the third circuitry causes the second circuitry to provide the second voltage to the charging contact to charge the rechargeable battery.

2. The system of claim 1, wherein in response to detection by the third circuitry of a second current value that is one or more of greater than the threshold maximum value or less than the threshold minimum value, the third circuitry causes the first circuitry to provide the first voltage to the charging contact.

3. The system of claim 1, the wearable device further comprising an undervoltage lockout circuit that causes the first voltage to be conducted across the resistor and away from the rechargeable battery.

4. A method comprising:
    providing a first voltage from a first device to a second device wherein the second device comprises:
        a resistor associated with a first resistance value;
        a first conductor connected to the resistor;
        a second conductor connected to the resistor; and
        a third conductor isolated from electrical communication with the resistor;
    determining a first current value associated with conduction of the first voltage through the resistor of the second device;
    determining that the first current value is less than a first threshold maximum value indicative of an alternate conductive path through the second device, wherein the alternate conductive path through the second device one or more of:
        conducts the first voltage from the first conductor to the third conductor;
        conducts the first voltage from the third conductor to the second conductor; or
        conducts the first voltage form the first conductor to the second conductor across the third conductor; and
    in response to the first current value being less than the first threshold maximum value, providing a second voltage greater than the first voltage from the first device to the second device.

5. The method of claim 4, further comprising:
in response to determining the first current value being one or more of:
less than a threshold minimum value that corresponds to the first resistance value, or
greater than the first threshold maximum value,
providing the first voltage from the first device to the second device.

6. The method of claim 4, further comprising:
in response to determining the first current value being greater than the first threshold maximum value, causing one or more of the first device or the second device to present an indication that is indicative of the alternate conductive path.

7. The method of claim 4, wherein
the first voltage is conducted from the first conductor through the resistor to the second conductor.

8. The method of claim 4, further comprising:
in response to determining the first current value being greater than the first threshold maximum value, providing the first voltage from the first device to the second device.

9. The method of claim 4, further comprising:
after providing the second voltage from the first device to the second device, determining a second current value associated with conduction of the second voltage;
determining that the second current value is less than a threshold minimum value that corresponds to the first resistance value; and
in response to the second current value being less than the threshold minimum value, ceasing providing the second voltage and beginning providing the first voltage.

10. The method of claim 4, further comprising:
after providing the second voltage from the first device to the second device, increasing the first threshold maximum value to a second threshold maximum value;
determining a second current value indicative of conduction of the second voltage through the second device;
determining that the second current value is greater than the second threshold maximum value; and
in response to the second current value being greater than the second threshold maximum value, one or more of:
ceasing providing the second voltage from the first device to the second device, or decreasing the second voltage provided from the first device to the second device.

11. A system comprising:
a first device comprising:
first circuitry that provides a first voltage;
second circuitry that provides a second voltage greater than the first voltage; and
third circuitry in electrical communication with the first circuitry, wherein the third circuitry determines a first current value associated with providing the first voltage; and
a second device comprising:
a first conductor in electrical communication with the first circuitry;
a second conductor in electrical communication with the first circuitry; and
a resistor connected to the first conductor and the second conductor, wherein the first voltage is conducted from the first conductor through the resistor to the second conductor, and the resistor is associated with a resistance value;
wherein in response to the first current value being:
greater than a threshold minimum value indicative of a first conductive path between the first circuitry and the second device, and
less than a first threshold maximum value indicative of the first conductive path and at least one second conductive path between the first circuitry and the second device,
the second circuitry provides the second voltage.

12. The system of claim 11, wherein the resistance value corresponds to the threshold minimum value.

13. The system of claim 11, wherein the second device further comprises:
a power source; and
fourth circuitry that causes the first voltage to be conducted through the resistor and away from the Power Source, and causes the second voltage to be conducted to the power source.

14. The system of claim 11, wherein the second device further comprises:
a third conductor isolated from electrical communication with the resistor, wherein the at least one second conductive path one or more of:
conducts the first voltage from the first conductor to the third conductor;
conducts the first voltage from the third conductor to the second conductor; or
conducts the first voltage from the first conductor through the third conductor to the second conductor; and
the third circuitry determines the first current value based at least in part on the third conductor.

15. The system of claim 11, wherein in response to the first current value being one or more of: less than the threshold minimum value or greater than the first threshold maximum value, the third circuitry one or more of: causes the first circuitry to provide the first voltage or prevents the second circuitry from providing the second voltage.

16. The system of claim 11, wherein in response to the first current value being greater than the first threshold maximum value, the third circuitry one or more of: causes the first device to present an indication that is indicative of the at least one second conductive path, or causes the second device to present the indication that is indicative of the at least one second conductive path.

17. The system of claim 11, wherein after the second circuitry provides the second voltage:
the third circuitry determines a second current value associated with providing the second voltage; and
in response to the second current value being less than the threshold minimum value, the second circuitry ceases providing the second voltage and the first circuitry begins providing the first voltage.

18. The system of claim 11, wherein after the second circuitry provides the second voltage:
the third circuitry increases the first threshold maximum value to a second threshold maximum value and determines a second current value indicative of conduction of the second voltage to the second device; and
in response to the second current value being greater than the threshold minimum value and less than the second threshold maximum value, the second circuitry continues providing the second voltage.

19. The system of claim 11, wherein after the second circuitry provides the second voltage:
the third circuitry increases the first threshold maximum value to a second threshold maximum value and determines a second current value indicative of conduction of the second voltage to the second device; and in response to determining the second current value being greater than the second threshold maximum value, the second circuitry ceases providing the second voltage.

20. The system of claim 11, wherein the third circuitry comprises:

a comparator circuit that provides a signal in response to a comparison between the first current value, the threshold minimum value, and the first threshold maximum value; and a switch in electrical communication with one of the first circuitry or the second circuitry that receives the signal and in response to the signal, begins electrical communication with the other of the first circuitry or the second circuitry.

\* \* \* \* \*